Nov. 9, 1965   M. P. LE NABOUR   3,216,653
EJECTORS AND PIPING SYSTEMS OPERATING WITH
A DIVERGENT FLUID WALL
Filed July 9, 1962

INVENTOR
Marcel Pierre Le Nabour

BY Stevens, Davis, Miller & Mosher
ATTORNEYS

United States Patent Office 3,216,653
Patented Nov. 9, 1965

3,216,653
EJECTORS AND PIPING SYSTEMS OPERATING WITH A DIVERGENT FLUID WALL
Marcel Pierre Le Nabour, Montreuil-sous-Bois, France, assignor to Société Bertin & Cie, Paris, France, a company of France
Filed July 9, 1962, Ser. No. 208,430
Claims priority, application France, July 26, 1961, 869,390
4 Claims. (Cl. 230—95)

This invention relates to devices for augmenting the momentum of a flow of fluid, of the kind (hereinafter referred to as the kind described) in which ambient fluid is induced to flow through a convergent-divergent passage of which a convergent portion is formed by a solid wall, and a divergent portion is constituted, in operation by a wall of auxiliary fluid issuing under pressure from a nozzle in the form of a slot at the downstream and of the solid wall.

Devices of this kind, and some of their uses, have been described in the specification of U.S. Patent No. 2,922,277, in the name of Jean Bertin.

In accordance with the present invention, in a device of the kind described, the slot is bounded by an external lip constituted by a divergent solid wall forming a neck, and is bounded by an internal lip whose downstream edge is positioned adjacent the said neck.

Figure 1:
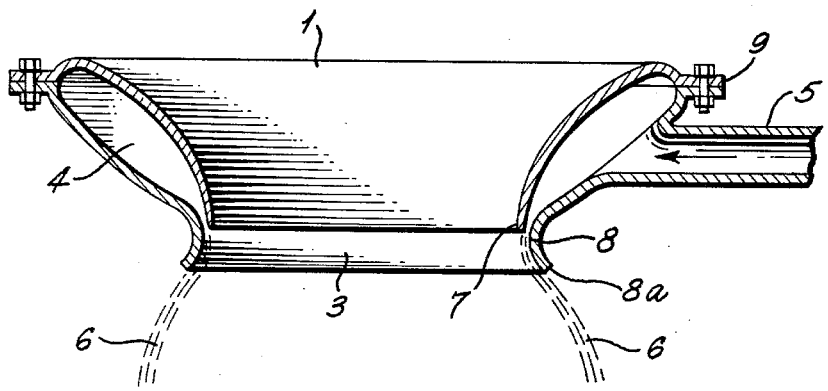
Figure 2:
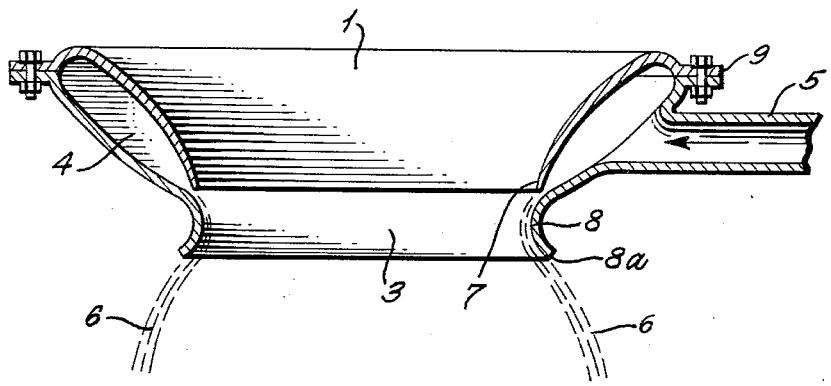

Features and advantages of the invention will appear from the following description, two forms of device in accordance therewith, the device being illustrated in the accompanying drawings, in which:

FIGURE 1 is an axial cross-section of one device, and
FIGURE 2 is an axial cross-section of the second device.

In the drawings like reference numerals identify like parts in the two figures.

Each of the devices illustrated comprises a solid walled convergent portion 1, an annular nozzle or slot 3, an annular collector 4 which supplies an auxiliary fluid under pressure to the said slot, and a conduit 5 for feeding the auxiliary fluid to the collector 4, so as to form a divergent fluid jet or wall 6 which issues from the slot and forms an extension of the internal surface of the convergent portion 1.

The slot 3 is bounded by an internal lip 7 whose lower edge is adjacent the neck of the convergent portion 1. In the device shown in FIGURE 1, the lip is formed at this neck, while in the device shown in FIGURE 2 it is positioned a short distance upstream of the neck. The slot 3 is also bounded by an outer lip constituted by a solid wall which forms a neck portion 8 and a short divergent portion 8A. Preferably, the developed length of the divergent portion 8A is not greater than 15% of the width of the neck.

With these arrangements, the fluid emerging from the slot 3 is caused to diverge by its adherence to the divergent wall portion 8A. The efficiency of the device derives from the design of the slot, by which friction is reduced, and from the effective mixing of the inducing and induced flows.

The design of the devices is such as to allow of their production in two concentric parts which are fitted together at a plane of junction 9, thus facilitating assembly and disassembly.

One of these parts includes the convergent wall 1 and the inner lip 7 at the lower edge thereof, while the other part forms the external lip of the slot, and a wall of the collector 4 through which the auxiliary fluid is supplied to the slot.

The devices may be put to all the uses described in the above mentioned patent specification, such as simple aspirators or ejectors, aircraft lifting devices and the like.

What I claim is:

1. A jet augmenter comprising a convergent duct bounded by a physical wall and a divergent duct bounded in a minor beginning portion by a physical wall and in its major portion by a fluid wall extending from said last named physical wall, means for forming said fluid wall comprising nozzle means extending along and outside the entire periphery of the downstream end of the said convergent duct, said nozzle means opening in the downstream direction and having an outside terminal divergent lip which extends downstream of the downstream end of said convergent duct a length equal to a fraction of the transverse dimension of said downstream end, and which forms said minor beginning portion of said divergent duct, and means for supplying said nozzle means with a fluid at a substantial overpressure in relation to the ambient medium, whereby a fluid jet issues from the said nozzle means, said jet first flowing along said divergent lip and thereafter forming said fluid wall.

2. A jet augmenter comprising a convergent duct bounded by a physical wall and a divergent duct bounded in a minor beginning portion by a physical wall and in its major portion by a fluid wall extending from said last named physical wall, means for forming said fluid wall comprising nozzle means extending along and outside the entire periphery of the downstream end of said convergent duct, said nozzle means opening in the downstream direction and having an outside terminal convergent divergent lip which extends downstream of the downstream end of the said convergent duct a length equal to a fraction of the transverse dimension of said downstream end, and the divergent part of which forms the minor beginning portion of the divergent duct, said lip having a neck and being positioned with respect to said convergent duct so said neck is located substantially adjacent to and a small distance downstream of said downstream end of said convergent duct, and means for supplying said nozzle means with a fluid at a substantial overpressure in relation to the ambient medium, whereby a fluid jet issues from the said nozzle means, said jet first flowing along said lip and thereafter forming said fluid wall.

3. A jet augmenter as claimed in claim 1 wherein the developed length of the said lip is at most 15% of the transverse dimension of said end.

4. A jet augmenter as claimed in claim 1 wherein said lip is a part of a physical wall surrounding said convergent duct and fixed to said duct by releasable means, said wall further providing an annular collector for feeding said nozzle means with pressure fluid.

References Cited by the Examiner

UNITED STATES PATENTS

| 2,722,372 | 11/55 | Edwards | 230—95 |
|---|---|---|---|
| 2,812,636 | 11/57 | Kodosch et al. | 60—35.55 |
| 2,922,277 | 1/60 | Bertin | 60—35.5 |
| 3,012,738 | 12/61 | Bertin et al. | |
| 3,029,045 | 4/62 | Bertin et al. | 60—35.5 X |
| 3,047,208 | 7/62 | Coanda | 230—95 |

FOREIGN PATENTS

| 948,350 | 8/56 | Germany. |
|---|---|---|
| 584,254 | 1/47 | Great Britain. |

MARK NEWMAN, *Primary Examiner.*
SAMUEL LEVINE, *Examiner.*